United States Patent [19]
DiMarco

[11] Patent Number: 5,918,946
[45] Date of Patent: Jul. 6, 1999

[54] LUG NUT LOCK

[75] Inventor: Robert J. DiMarco, Troy, Mich.

[73] Assignee: McKechnie Vehicle Components (USA), Inc., Troy, Mich.

[21] Appl. No.: 08/961,802

[22] Filed: Oct. 31, 1997

[51] Int. Cl.⁶ .................................................... B60B 7/14
[52] U.S. Cl. ..................................... 301/37.37; 301/108.4
[58] Field of Search .............................. 301/37.1, 37.37, 301/37.42, 108.4

[56] References Cited

U.S. PATENT DOCUMENTS

| | | |
|---|---|---|
| 4,382,635 | 5/1983 | Brown et al. . |
| 4,842,339 | 6/1989 | Roulinson . |
| 4,895,415 | 1/1990 | Stay et al. . |
| 4,998,780 | 3/1991 | Eshler et al. . |
| 5,163,739 | 11/1992 | Stanlake . |
| 5,181,767 | 1/1993 | Hudgins et al. . |
| 5,249,845 | 10/1993 | Dubost . |
| 5,286,093 | 2/1994 | Wright . |
| 5,294,189 | 3/1994 | Price et al. . |
| 5,503,465 | 4/1996 | Price et al. . |
| 5,520,445 | 5/1996 | Toth . |
| 5,595,422 | 1/1997 | Ladouceur ........................ 301/37.37 X |
| 5,667,281 | 9/1997 | Ladouceur ............................ 301/37.37 |

*Primary Examiner*—Russell D. Stormer
*Attorney, Agent, or Firm*—Bliss McGlynn, P.C.

[57] ABSTRACT

A lug nut lock is used to mechanically lock a cover assembly to a lug nut resulting in a lock to the wheel and/or hub. The lug nut lock includes a lug well extending out from its inboard surface to a distal end. An engagable surface extends out from the distal end. Retention legs extend outwardly from the walls of the lug well. The retention legs include threaded surfaces engagable with a threaded surface of a compression nut. The compression nut forces or compress the retention legs inwardly forcing the engagable surfaces to engage a bottom surface of a lug nut locking the cover assembly to the lug nut.

14 Claims, 2 Drawing Sheets

LUG NUT LOCK

BACKGROUND OF THE INVENTION

1. Field of the Invention

The invention relates to cover assemblies for vehicular wheels and hubs. More specifically, the invention relates to a locking system for securing a cover assembly to a vehicular wheel, hub and/or lug nut.

2. Description of the Related Art

Wheel and hub covers (hereinafter "wheel cover"), are used to decorate vehicular wheels. Many attempts have been made to conveniently and effectively secure the wheel cover to the wheel. One such attempt is disclosed in U.S. Pat. No. 4,382,635, issued to Brown, et al. This reference discloses a wheel cover which covers a portion of the wheel, the lug nuts and all access thereto. Axial fingers resiliently grip at least one lug nut to secure the wheel cover to the wheel. This system requires forcing the axial fingers back over the lug nut when removing the wheel cover so that the lug nuts may be accessed. This is a disadvantage because repeatedly accessing the lug nuts will reduce the resiliency of the axial fingers resulting in a loose wheel cover which vibrates and may be lost if the vibrations are of such a large magnitude to force the axial fingers back over the lug nuts. This will result in a greater frequency of wheel covers which may be lost or damaged due to the reduced resiliency of the axial fingers.

U.S. Pat. No. 5,249,845, issued to Dubost, discloses a wheel cover with lug covers which move with respect to the wheel cover to secure the wheel cover to the wheel about the lug nuts. Although securing this wheel cover depends less on the resilient nature of the attaching portions, or axial fingers, the whole wheel cover must be removed to obtain access to the lug nuts. The removal of the complete wheel cover is undesirable.

SUMMARY OF THE INVENTION

A cover assembly covers a wheel secured to the wheel hub by a lug nut. The cover assembly includes a cover having a lug well extending from the cover to a distal end. The distal end includes a lug opening for receiving the lug nut therethrough. The cover also includes a retention leg extending out from the lug well. The cover further includes a compression nut which is removably engagable with the retention leg. The compression nut compresses the retention leg inwardly such that the distal end engages the lug nut securing the cover to the lug nut.

One advantage associated with the invention is the ability to decoratively cover a vehicular wheel and/or hub. Another advantage associated with the invention is the ability to provide a cover which may remain affixed to the wheel while providing access to the lug nuts.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
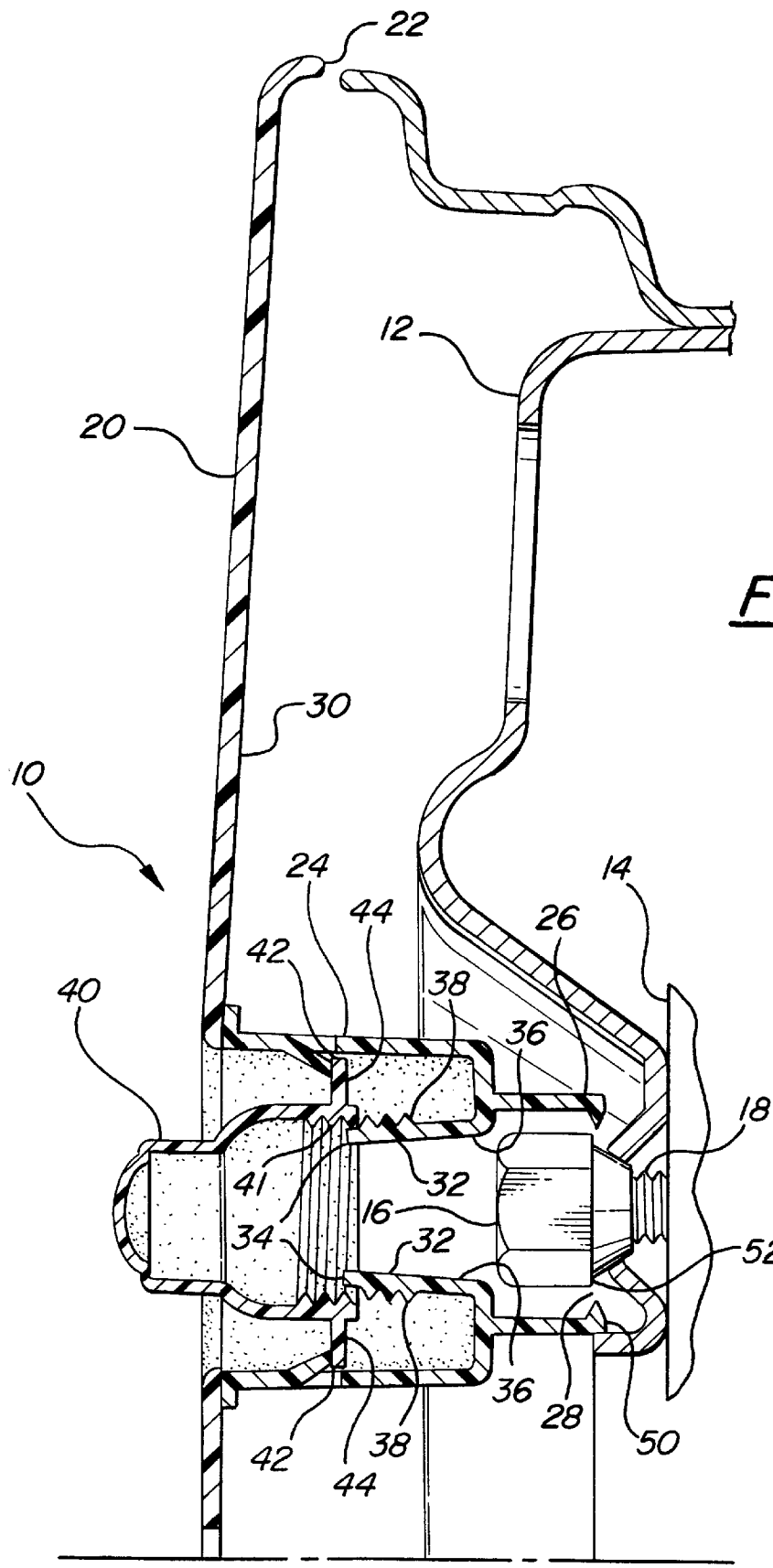
FIG. 1 is a cross-sectional side view of one embodiment of the invention.
Figure 2:
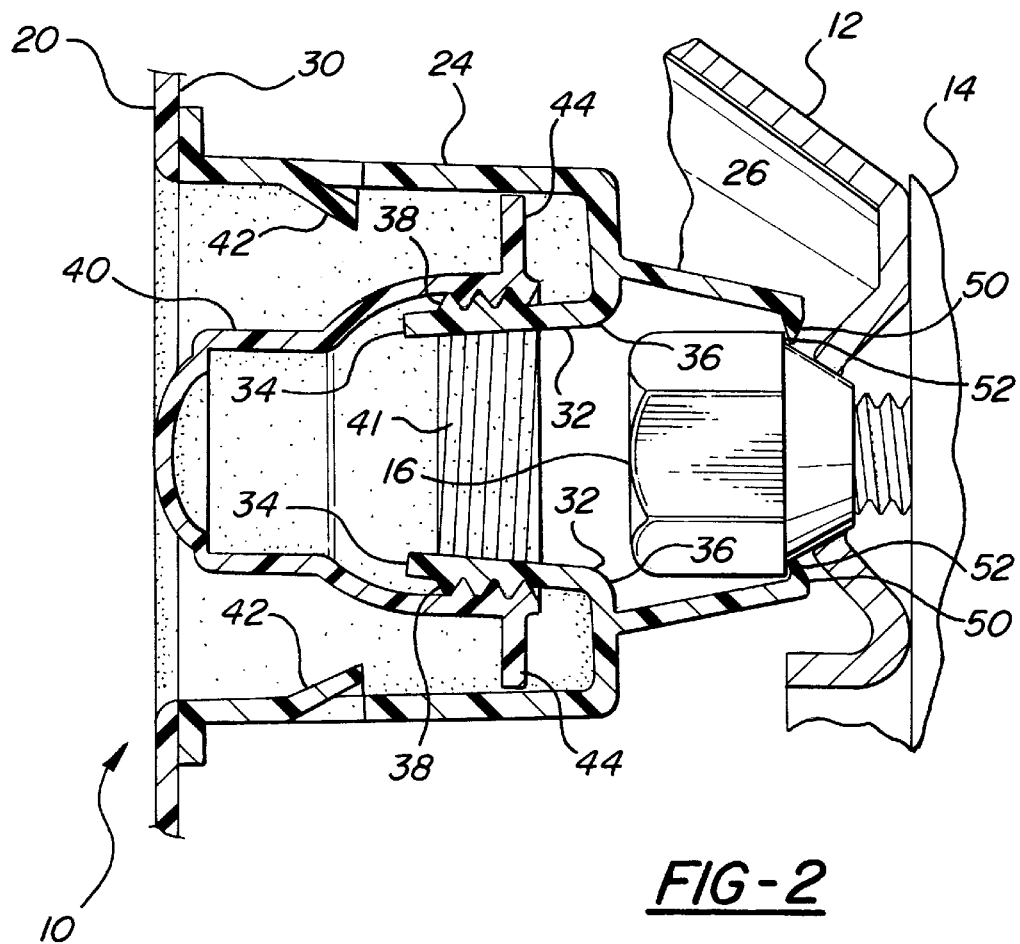
FIG. 2 is a cross-sectional side view of one embodiment of the invention.

Referring to FIGS. 1 and 2, one embodiment of a wheel and hub cover assembly (hereinafter the "wheel cover assembly"), is generally indicated at 10. The wheel cover assembly 10 covers a wheel 12 secured to a wheel hub 14 of a motor vehicle (not shown) using at least one lug nut 16. The lug nut 16 is threadingly engagable with a lug stud 18. It may be appreciated by those skilled in the art that the lug nut 16 may include the lug stud 18 wherein the lug stud/lug nut combination would be threadingly engagable with the wheel hub 14.

The wheel cover assembly 10 includes a cover 20. The cover 20 covers the wheel hub 14 and/or at least a portion of the wheel 12. In the embodiment shown in FIG. 1, the cover 20 covers the entire wheel 12. The cover 20 may include a decorative coating and/or detail (not shown) to enhance the aesthetics of the wheel 12. Although not shown, the cover 20 may include a mechanical lock at a periphery 22 of the cover 20 as is disclosed in U.S. Pat. No. 5,368,370 which is incorporated herein by reference. This mechanical lock may retain the cover 20 to the wheel 12 permanently.

The wheel cover assembly 10 further includes a lug well 24 which extends from the cover 20 to a distal end 26. The distal end 26 includes a lug opening 28 which receives the lug nut 16 therethrough. The lug well 24 extends down from an inboard surface 30 of the cover 20. The lug well 24 may be formed with the cover 20 or, as is shown in the Figures, it may be welded, bonded, or fixedly secured to the cover 20 in any suitable manner known to those skilled in the art. A retention leg 32 extends out from the lug well 24. The retention leg 32 defines a leg distal end 34 and an abutment end 36. The retention leg 32 includes a threaded surface 38. The width of the retention leg 32 may extend through an arcuate surface defining a cone or frustum. Alternatively, the width of the retention leg 32 may extend through or define a single plane. In the Figures, the embodiment of the wheel cover assembly 10 includes at least two retention legs 32.

The wheel cover assembly 10 also includes a compression nut 40 which is removably engagable with the retention leg 32. The compression nut 40 compresses the retention legs 32 inwardly such that the distal end 26 of the lug well 24 engages the lug nut 16 securing the wheel cover assembly 10 to the wheel 12. The compression nut 40 includes an interiorly threaded surface 41 which is threadingly engagable with the threaded surface 38 of the retention leg 32.

The lug well 24 includes at least one protrusion 42 which extends inwardly into the lug well 24. The protrusion 42 may be created by knocking out a portion of the lug well 24 and forcing that portion of the lug well 24 inwardly toward the center of the lug well 24. The protrusion 42 is formed to be resilient such that the protrusion 42 will return to its original position after it has been forced out of that position. Although the embodiment shown in FIGS. 1 and 2 show two protrusions, any number of protrusions 42 may be incorporated in the invention. In addition, if the lug well 24 is defined by a non-zero curvature, the protrusions 42 may be arcuate. If, however, the lug well 24 includes a plurality of flat walls, the protrusions 42 may be flat and extend through a single plane.

The compression nut 40 includes a retention ring 44 which extends outwardly from the compression nut 40 and engages the protrusion 42. The retention ring 44 may include a number of ring portions extending around the outer circumference of the compression nut 40 or it may be a complete ring thereabout. If ring portions are incorporated, the number of protrusions 42 required will increase to decrease the size of spaces therebetween such that the ring portions will not be capable of passing through the spaces between the protrusions 42. When placing the compression nut 40 in the lug well 24, the retention ring 44 engages the protrusions 42. The retention ring 44 biases the protrusion 42 outwardly toward the lug well 24 until it passes thereby. Upon passing, the protrusion 42 returns to its original position preventing the compression nut 40 from subsequently passing out of the lug well 24.

The lug well 24 extends to the lug opening 28 defined by an engagable surface 50 at the distal end 26. The engagable surface 50 extends inwardly toward the center of the lug well 24. The engagable surface 50 engages a bottom surface 52 of the lug nut 16 to create a mechanical lock retaining the wheel cover assembly 10 to the lug nut 16 and, therefore, to the wheel 12. The engagable surface 50 may include a surface treatment used to increase the friction between it and the bottom surface 52 of the lug nut 16.

Figure 3:
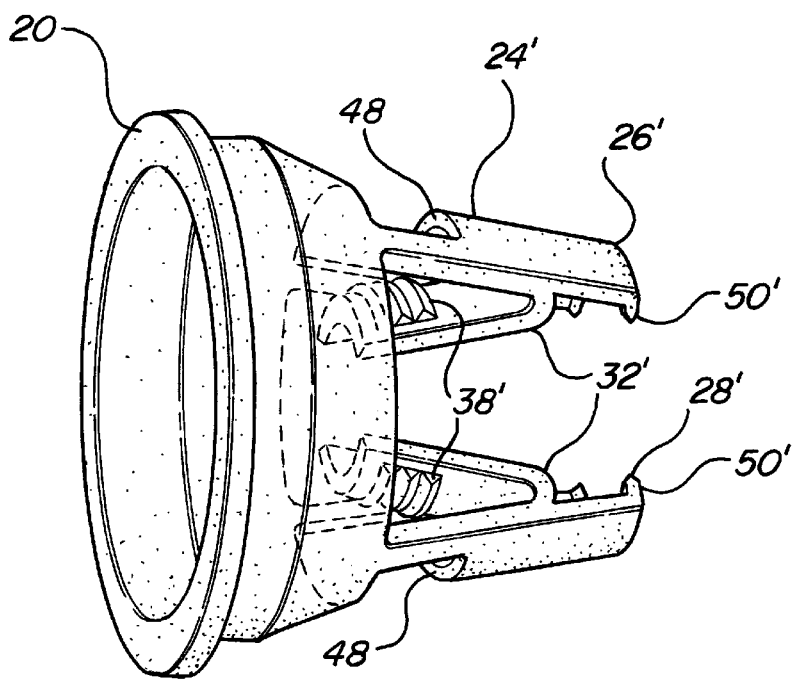
FIG. 3 is a perspective view of an alternative embodiment of the invention.

An alternative embodiment of the invention is shown in FIG. 3 wherein like primed numerals represent a similar structure to that of the embodiment shown in FIGS. 1 and 2. In this embodiment, the lug well 24' is frustoconical in shape. In this embodiment, at least one slot 48 replaces the protrusions 42 in the embodiment shown in FIGS. 1 and 2. The slots 48 receive a retention ring to lock a compression nut (not shown) in the lug well 24'.

In operation, the wheel cover assembly 10 is forced onto the wheel 12 at which time the wheel cover assembly 10 may be locked and/or sealed to the wheel 12 or wheel hub 14 using methods known in the art. The compression nut 40 is then moved into the lug well 24. The retention ring 44 of the compression nut 40 passes over the protrusions 42 preventing the compression nut 40 from leaving the lug well 24. The compression nut 40 is then threadingly engaged to the retention leg 32 which, in turn, forces an engagable surface 50, located at the distal end 26 of the lug well 24 inwardly into engagement with a bottom surface 52 of the lug nut 16. By screwing the compression nut 40 onto the retention leg 32, the engagable surfaces 50 engage the lug nut 16 providing a mechanical lock for the wheel cover assembly 10 to secure it to the lug nut 16 solely or in combination with another locking mechanism, mechanical or chemical.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A cover assembly for covering at least a portion of a wheel secured to a wheel hub by a lug nut, said cover assembly comprising:

a cover;

a lug well extending from said cover to a distal end, said distal end including a lug opening for receiving the lug nut therethrough;

a retention leg extending out from said lug well toward said cover; and a compression nut removably engagable with said retention leg, said compression nut compressing said retention leg inwardly such that said distal end engages the lug nut securing said cover assembly to the lug nut.

2. A cover assembly as set forth in claim 1 wherein said retention leg includes a threaded surface for receiving said compression nut thereagainst.

3. A cover assembly as set forth in claim 2 wherein said lug well includes a protrusion extending therein.

4. A cover assembly as set forth in claim 3 wherein said compression nut includes a retention ring extending outwardly therefrom such that said retention ring engages said protrusion.

5. A cover assembly as set forth in claim 2 wherein said compression nut includes an interiorly threaded surface threadingly engagable with said threaded surface of said retention leg.

6. A cover assembly as set forth in claim 2 wherein said retention leg includes a leg distal end and an abutment end.

7. A cover assembly as set forth in claim 6 wherein said threaded surface is disposed adjacent said leg distal end.

8. A cover assembly as set forth in claim 1 wherein said lug well is substantially frustoconical.

9. A cover assembly for covering at least a portion of a wheel secured to a wheel hub by a lug nut, said cover assembly comprising:

a cover;

a lug well extending from said cover to a distal end, said distal end defining a lug opening for receiving the lug nut therethrough;

a retention leg extending out from said lug well toward said cover, said retention leg including a threaded surface; and a compression nut threadably engagable with said retention leg, said compression nut including a mating threaded surface to matingly engage with said threaded surface of said retention leg to compress said retention leg inwardly such that said distal end engages the lug nut securing said cover assembly to the lug nut.

10. A cover assembly as set forth in claim 9 wherein said lug well includes a protrusion extending therein.

11. A cover assembly as set forth in claim 10 wherein said compression nut includes a retention ring extending outwardly therefrom such that said retention ring engages said protrusion.

12. A cover assembly as set forth in claim 9 wherein said compression nut includes an interiorly threaded surface threadingly engagable with said threaded surface of said retention leg.

13. A cover assembly as set forth in claim 9 wherein said retention leg includes a leg distal end and an abutment end.

14. A cover assembly as set forth in claim 13 wherein said threaded surface is disposed adjacent said leg distal end.

* * * * *